UNITED STATES PATENT OFFICE 2,588,359

NICKEL-COPPER-CHROMIA-ALKALI METAL SULFATE CATALYST AND ITS PREPARATION

Henry C. Chitwood, John T. Fitzpatrick, George W. Fowler, and Benjamin T. Freure, Charleston, W. Va., assignors, by mesne assignments, to Union Carbide and Carbon Corporation, a corporation of New York No Drawing. Application February 16, 1949, Serial No. 76,852

11 Claims. (Cl. 252—440)

The present invention relates to hydrogenation catalysts and to catalytic dehydrogenations carried out in the presence of a hydrogenation catalyst. More particularly, it is concerned with an improved nickel hydrogenation catalyst containing copper mostly in the form of copper metal, and chromium mostly in the form of its oxide which has been stabilized for catalytic dehydrogenation operation by the presence therein of a small amount of alkali metal sulfate. The invention includes as an integral and inseparable part thereof the method of making our improved catalyst and the catalytic dehydrogenation of oxygenated hydroaromatic compounds to produce phenols which is the best mode in which it is contemplated to apply the new and improved catalyst, as in the production of phenol from cyclohexanol, cyclohexanone, or mixtures thereof; of meta-cresol from 3-methyl cyclohexenone; of pyrocatechol from cyclohexanediol-1,2; and the like.

That cyclohexanone and cyclohexanol can be dehydrogenated to phenol over nickel has been known for many years. According to Sabatier, the conversion of cyclohexanol to phenol over nickel at a temperature of 360° C. was reported as early as 1908 by Padoa and Fabris in Atti Reale Accad. Lincei, 17 (1) 111 and 125. In 1911, Skita and Ritter [Ber. 44, 668 (1911)] described the production of phenol from cyclohexanone, over nickel, in the presence of hydrogen, at a reaction temperature of 220° to 250° C. In a number of publications [Berichte 44, 1984 (1911); C. r. 168, 670-2 (1919); Catalysis in Organic Chemistry (1922)], Sabatier described the dehydrogenation of cyclohexanol and its homologs to phenols over nickel catalyst at temperatures above 350° C., in a stream of hydrogen.

The reaction for the aromatization of hydroaromatics is not as easily effected as might be assumed from the writings of the earlier workers in this field. The extensive patent and other literature on the dehydrogenation of cyclohexanone (or cyclohexanol) may be regarded as indicative that this reaction has been the subject of considerable research. A very difficult problem and one which has hindered attempts to provide a practicable process for the production of phenol from cyclohexanone is that of isolation of the phenol. Phenol and cyclohexanone form a maximum boiling azeotrope containing about 75 per cent of phenol, so that any process which does not give greater than about 75 per cent conversion must employ some means of separation other than simple distillation to recover the phenol. The methods thus far suggested appear to be too complicated and expensive.

The present invention is based on our discovery that nickel can be stabilized for operation as a dehydrogenation catalyst at relatively high temperature by the presence of a small amount of alkali metal sulfate. For instance, using our stabilized nickel catalyst, conversions as high as 90 per cent and above can be obtained at a temperature of 350° C., in the dehydrogenation of oxygenated cyclohexane (cyclohexanol, cyclohexanone and mixtures of them). Furthermore, our stabilized catalyst retains its activity over a long period of operation at the dehydrogenation temperatures required for such high degrees of conversion, as compared with the nickel catalysts of the prior art which do not.

The formation of phenol by dehydrogenation of cyclohexanol and cyclohexanone, a reaction for which our stabilized nickel catalyst is especially well adapted, is illustrated by the following equations:

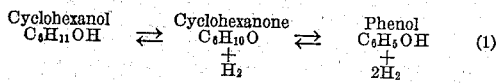

The reactions, which are reversible, take place on passing the oxygenated cyclohexane over the stabilized catalyst heated to the dehydrogenation temperature. As far as is known, the reactions do not depart from the laws or principles which have been generally accepted as governing opposing reactions, equilibrium and equilibrium concentrations. Accordingly, the ratios of the amounts of the cyclohexanol, cyclohexanone and phenol present at equilibrium depend upon the temperature and hydrogen pressure (concentration). As will be apparent, the equilibrium represented by the equation can be shifted to the left by increasing the hydrogen pressure. An increase in reaction temperature, on the other hand, shifts the equilibrium to the right, by reason of the free energy relations of the system.

By way of further illustration, the equilibrium for cyclohexanone, phenol and hydrogen is expressed by the following equation:

$$\frac{p_{(phenol)} \times p_{(hydrogen)}^2}{p_{(cyclohexanone)}} = k$$

in which $p_{(phenol)}$, $p_{(hydrogen)}$, and $p_{(cyclohexanone)}$ are the partial pressures in the system of phenol, hydrogen and cyclohexanone, respectively, and $k$ varies with the temperature. Stated in other words, the molar ratio of phenol to cyclohexanone, at equilibrium, is inversely proportional to the square of the hydrogen pressure:

$$\frac{p_{(phenol)}}{p_{(cyclohexanone)}} = \frac{k}{p_{(hydrogen)}^2}$$

in which $k$ has the value of 0.0566, 0.327, 1.64 and 33.6 at temperatures of 250°, 275°, 300° and 350° C., respectively. Thus at a temperature of 350° C., for instance, the molar ratio of phenol to cyclohexanone at one atmosphere of hydrogen pressure is 33.6; at five atmospheres, 1.34; and at ten atmospheres, 0.336; corresponding to mol percentages of phenol in admixture with cyclohexanone of 97.1, 57.2 and 25.1, respectively. The mol per cents for other temperatures and pressures may be arrived at similarly.

The equilibrium between cyclohexanone, cyclohexanol and hydrogen is affected by temperature to a lesser degree. For the equilibrium represented by the following equation:

$$\frac{p_{(cyclohexanone)} \times p_{(hydrogen)}}{p_{(cyclohexanol)}} = c$$

in which $p_{(cyclohexanone)}$, $p_{(hydrogen)}$ and $p_{(cyclohexanol)}$ are the partial pressures of cyclohexanone, hydrogen, and cyclohexanol, respectively, $c$ has a value of 0.30, 0.75, 1.5 and 8.63 at temperatures of 220°, 250°, 275° and 350° C., respectively.

From the foregoing it will be seen that at the conditions for a molar ratio of phenol to cyclohexanone of 90 to 97 per cent (350° and a hydrogen pressure of not more than one atmosphere) most of the oxygenated cyclohexane is in the form of cyclohexanone, the amount of cyclohexanol being negligible. As the temperature is lowered the amount of phenol decreases and the ratio of cylcohexanol to cyclohexanone increases. At equilibrium, at 275° C., and one atmosphere of hydrogen pressure, approximately one-half of the total amount of organic material present exists as cyclohexanone, while at a temperature of 250° and below cyclohexanol predominates.

As the stabilizing constituent in our new and improved nickel catalysts, the following alkali metal sulfates can be used: lithium sulfate, sodium sulfate, potassium sulfate, rubidium sulfate and caesium sulfate or mixtures of them. The amounts in which each have been found to give satisfactory results, based on the nickel, are set down in the following table:

| Alkali sulfate | Weight, per 100 parts of nickel | Gram-mols, per 100 gram-atoms of nickel |
| --- | --- | --- |
| Lithium sulfate | 0.3 to 0.8 | 0.16 to 0.43 |
| Sodium sulfate | 0.3 to 0.8 | 0.12 to 0.33 |
| Potassium sulfate | 0.3 to 1.0 | 0.10 to 0.34 |
| Rubidium sulfate | 0.3 to 1.5 | 0.06 to 0.33 |
| Caesium sulfate | 0.3 to 2.0 | 0.05 to 0.33 |

This useful range, it is to be noted, is quite uniform for all of the alkali sulfates in terms of parts by weight near the lower limit and, with the exception of lithium sulfate, in terms of grammols per 100 gram-atoms of nickel near the upper limit end of the range. Decreasing the alkali sulfate content below 0.3 part per 100 parts of nickel or increasing it above 0.43 gram-mol per 100 gram-atoms of nickel, has a striking detrimental effect on the life and activity of the catalyst. The effect of the alkali sulfate concentration on the life and activity of the catalyst is not nearly so critical for the sulfates of the heaviest alkali metals as it is for the lithium sulfate, and to a lesser degree the sodium sulfate. The optimum concentration appears to be about 0.6 part of alkali sulfate per 100 parts of nickel, by weight, which value is preferred.

The alkaline earth sulfates, magnesium sulfate, calcium sulfate, strontium sulfate and barium sulfate also have some promoting action, the barium sulfate especially contributing a high activity but with a short catalyst life.

From the foregoing it will be obvious that, without departing from the spirit of the invention, stabilized nickel dehydrogenation catalysts can be made using as stabilizing constituent one of the alkali metal sulfates in admixture with one or more other alkali metal sulfates, and to a more limited extent an alkaline earth sulfate, such that the one replaces another, in part. Such modifications are intended to be within the scope of this specification.

Copper, which is also an essential constituent of our stabilized catalyst, is present mostly in the form of metallic copper. In amount, it may be varied over a range from about 15 to 40 parts of copper per 100 parts of nickel without greatly influencing the behavior of the catalyst.

Chromium, which is also an essential constituent, present mostly in the form of its oxide, is much more critical as to amount. The useful range of chromium oxide content corresponds to about 0.5 to 4 parts of chromium per 100 parts of nickel by weight. At concentrations below 0.5 part, the activity of the catalyst is lowered, and at any concentration much higher or lower than 2 parts of chromium per 100 parts of nickel, the efficiency decreases due to the elimination from the oxygenated hydroaromatic compound of both oxygen and hydrogen in the same proportion as in water. The best results are obtained with a chromium content of 2 parts per 100 parts of nickel, which is preferred.

Platinum metals, for instance, platinum and palladium, which have commonly been used as promoters for nickel catalysts, can be used in our stabilized nickel catalyst without observable detrimental effect. Their use, however, is unnecessary.

With our stabilized nickel dehydrogenation catalyst, phenol can be produced from either cyclohexanol, cyclohexanone or a mixture of them at a conversion of about 95 per cent or above, over periods of operation as long as 140 hours. At conversions of 95 per cent, approximately 80 per cent of the phenol produced from cyclohexanone by the process of the invention can be separated in the pure state by distillation. The phenol remaining in the constant boiling mixture, in association with about one-third its weight of unconverted cyclohexanone, can be recycled to the converter without detrimental effect on the process or the catalyst activity.

In preparing the catalyst, a mixture containing the metals in the desired ratios can be made by dissolving proportionate amounts of water-soluble compounds of the metals, for instance, the nitrates in a sufficient quantity of water to form a solution. Only pure materials should be used, the term "pure" being used in the sense that the compounds are free of injurious or unknown contaminants. Slab electrolytic nickel dissolved in nitric acid is a convenient source of pure nickel. The solution containing the metals is poured over the support material in a suitable vessel. Practically any material can be used for a support which is inert, chemically and catalytically, and very porous and reasonably strong. A porous, ceramically-bonded silica, currently sold under the trade name "Filtros" is very suitable. The support material should have first been heated with nitric acid or sulfuric acid and then thoroughly washed with water to remove solubilizable alkali or alkaline earth salts, which might be present in unknown and undeterminable amount. The mixture may then be evaporated to dryness in a suitable vessel while being stirred with a spatula or shovel. When the excess water has been evaporated the catalyst will assume a pasty consistency. At this stage the catalyst may be placed in an oven and roasted, but a superior catalyst is obtained if the drying by evaporation is continued further until discrete particles are obtained and the decomposition of the nitrates has begun.

The roasting of the material can be carried out by placing it in a muffle furnace heated to a temperature at which the nitrates will decompose and holding at that temperature until the evolution of the oxides of nitrogen ceases. A rapid roasting of the material is preferred. For this purpose a furnace temperature of 375° C. is suitable, and at this temperature a period of about three hours is required to complete the roasting. The granules are then separated from the fines and introduced into a converter tube where they are again heated to a temperature of about 375° C., in air. The freshly roasted catalyst, before reduction, has a non-uniform surface appearance. Thereafter, it is heated in a stream of hydrogen at a temperature of about 375° C. for a period of about eight hours. Hydrogen is kept on the catalyst when it is not in use.

The catalyst can also be made, if desired, by repeated dippings of the support into the solution containing the catalyst ingredients, with drying and roasting of the catalyst between dippings. Although the dipping procedure facilitates the handling of materials on a large scale, the single evaporation and roasting method permits a much closer control of the ratio of active materials in the finished catalyst, and is preferred.

In the drying of the catalyst mixture and the decomposition of the metal nitrates, the possibility exists that some of the sulfate content may also be lost, by volatilization as sulfuric acid, along with the water and oxides of nitrogen. To compensate for any such loss it is recommended that a slight amount of free sulfuric acid be added to the solution or to the mixture prior to drying and roasting. An amount of sulfuric acid which is about one to two times the weight of the alkali metal sulfate is considered sufficient, but more can be used, if desired. The role played by the free sulfuric acid is not clear and it might also be possible that the presence of a slight amount of free sulfuric acid together with rapid roasting of the mixture affects favorably the physical distribution of the essential catalyst ingredients. A theory or explanation as to the precise role played by the sulfuric acid is unnecessary to an understanding of the invention, however, and it is not intended here to be bound or limited in the describing or claiming of the invention by any theory or explanation offered.

The optimum operating temperature for the production of phenols by dehydrogenation of the corresponding oxygen-containing hydroaromatic compound is about 350° C. which is preferred. Satisfactory results have also been attained at temperatures up to 375° C., but the efficiency is lowered slightly because of hydrocarbon formation. Also, the catalyst life is diminished somewhat. As the converter temperature is decreased below 350° C., the conversion also falls off because the equilibrium is shifted in the direction of the opposing reaction, as set forth above. The temperature may be controlled by supplying heat from a heat transfer liquid surrounding the converter tubes holding the catalyst, or in any other suitable fashion.

The hydroaromatic compound is passed over the catalyst in vapor form. The best results have been obtained with a down-stream pressure near atmospheric pressure, which is preferred. As is to be noted from the above equation, applied pressures tend to favor the opposing reaction. Pressures lower than atmospheric may be used, but since the conversion is so nearly quantitative at atmospheric pressure, no great advantage in reduced pressures is apparent for most conversions.

In the production of phenol from cyclohexanone, the feed-rate of cyclohexanone to the catalyst is held low enough to give a very high concentration of phenol in the product, because it is only under such conditions that phenol can be separated by distillation from the cyclohexanone. A suitable feed rate is about 150 milliliters of cyclohexanone per liter of catalyst per hour. In cases where it is desirable to separate the phenol product by expedients other than distillation, higher feed rates may be used. The catalyst has high activity and is capable of producing phenol considerably faster than it does when operating to give maximum concentration of phenol in the product.

The process may be operated without feeding hydrogen into the converter but the catalyst life at high activity is greatly shortened. Although the hydrogen feed-rate is not critical, it nevertheless should not be excessive to the extent of adversely affecting the reaction because of the mass action effect. In the production of phenol from cyclohexanone a hydrogen partial pressure not in excess of three atmospheres pressure, absolute, is preferred.

The catalyst remains very active over long periods of careful operation and with feed materials free of sulfur and chlorine. Sulfur in the form of sulfides or mercaptans is especially to be avoided because as little as 100 parts per million of sulfur in the feed may cause loss in activity. When the catalyst does lose activity it can be restored by oxidizing with air at about 375° C. and again reducing with hydrogen at a temperature of 375° C. Iron and stainless steel are very suitable as converter tube materials. Nickel and alloys of nickel and copper are nearly as suitable as iron and stainless steel but in tubes made of nearly pure copper or bronze the catalyst life is shortened.

The following examples are illustrative.

Example 1

A catalyst was prepared by dissolving the following salts in sufficient distilled water to form a homogeneous solution:

| | Grams |
|---|---|
| Nickel nitrate, $Ni(NO_3)_2 \cdot 6H_2O$ | 600 |
| Copper nitrate, $Cu(NO_3)_2 \cdot 3H_2O$ | 150 |
| Chromic nitrate, $Cr(NO_3)_3 \cdot 9H_2O$ | 18 |
| Sulfuric acid (sp. gr. 1.84) | 1.2 |
| Sodium sulfate, $Na_2SO_4$ | 0.70 |

These proportions correspond to 32.6 parts of copper and 1.93 parts of chromium per 100 parts of nickel, calculated on a metal basis. The sodium sulfate amounts to 0.58 part per 100 parts of nickel.

Porous, ceramically bonded silica which had been heated with nitric acid and washed with water was placed in an evaporating dish. The above solution of metal salts was then poured over the silica and the resultant mixture evaporated under a hood to a nearly dry state, while stirring with a porcelain spatula. It was not possible to drive off all of the contained water because of the consequent decomposition of the nitrate and evolution of toxic vapors. The material was then placed in a muffle furnace which had previously been heated to a temperature of 375° C. and thereupon roasted at that temperature for a period of about three hours or until evolution of the oxides of nitrogen ceased. The resulting granules were then separated from the fines, placed in a converter tube, and heated in air at a temperature of 375° C. for a period of about six hours. Thereafter the catalyst was heated and reduced in a stream of hydrogen for eight hours at a temperature of about 375° C. When the catalyst was not in use it was stored in an atmosphere of hydrogen.

Example 2

Cyclohexanol and cyclohexanone were vaporized, mixed with hydrogen, and the resulting mixture passed at substantially atmospheric pressure over the catalyst of Example 1, contained in the converter. The catalyst was heated and maintained at a temperature of about 350° C. The feed rate was 150 grams of cyclohexanol-cyclohexanone mixture and 250 liters of hydrogen (measured at 25° C. and a pressure of 750 millimeters of mercury), per hour per liter of catalyst.

Phenol and unconverted cyclohexanone were condensed from the converter effluent by external cooling. Hydrogen needed for the converter feed can be recycled after the phenol and unconverted cyclohexanone have been condensed and separated from the hydrogen in the converter effluent, and the excess hydrogen can be utilized elsewhere.

The condensate from the converter was made up principally of phenol and cyclohexanone in the ratio of about 95 parts of phenol to 5 parts of cyclohexanone. Very small amounts of benzene and water were also present. About 80 parts of the phenol were separated by distillation. Because phenol and cyclohexanone form a maximum boiling azeotrope containing about 75 per cent phenol, the remaining 15 parts of the phenol were associated with the cyclohexanone of the condensate as the constant boiling mixture. This material was recycled to the converter and did not materially affect the operation of the catalyst.

Example 3

A catalyst was prepared by dissolving 8 pounds of electrolytic nickel slabs in an excess of nitric acid (C. P.; 35 per cent) in a stainless steel vessel. To this solution was added 10 pounds of copper nitrate trihydrate, $Cu(NO_3)_2.3H_2O$ (C. P.); 1.2 pounds chromium nitrate nonahydrate, $Cr(NO_3)_3.9H_2O$ (C. P.) and one pint of water solution containing 22 grams of sodium sulfate and 30 grams of sulfuric acid. These proportions correspond to 32.9 parts of copper and 1.95 parts of chromium per 100 parts of nickel, calculated on a metal basis. The sodium sulfate amounts to 0.6 part per 100 parts of nickel. This mixture was brought into solution and poured over one cubic foot of a 2 to 4 mesh porous, inert, ceramically bonded silica support material which had previously been washed with concentrated nitric acid and water. The mixture was then evaporated to dryness while being mixed with a stainless steel shovel.

After drying, the catalyst was charged to a hot roasting furnace where air was blown over it at 375° C. until evolution of the oxides of nitrogen ceased. A period of about four hours was required. After allowing the mixture to cool, it was gently screened to remove dust. About 56 per cent of the catalytic material adhered to the support. The nickel content (prior to hydrogenation) was about 6 per cent. The catalyst thus prepared exhibited high activity.

Example 4

The catalyst of Example 3 was charged into a converter which was equipped with a vaporizer, condenser, receiver, circulating compressor and instruments for ascertaining the conditions of operation. The catalyst was contained in a 3-inch by 20-foot iron tube surrounded by a suitable heat transfer medium which was electrically heated. The catalyst was reduced by passing a stream of hydrogen over it while the catalyst was maintained at a temperature of about 350° to 375° C. over a period of eight hours.

A mixture of cyclohexanone and cyclohexanol was fed to the steam-heated vaporized at a rate of seven pounds per hour while hydrogen was passed through the vaporizer at a rate of 116 cubic feed (standard conditions) per hour. The vaporized mixture of cyclohexanone, cyclohexanol and hydrogen was then passed through the catalyst bed (one cubic foot) at a catalyst temperature of about 350° C. Phenol of 95 per cent purity was condensed from the exit vapors of the converter. The efficiency of the conversion was 98 per cent.

After a run of 135 hours the phenol yield per pass was 95.6 per cent. At the end of this period of operation the feed was changed to a mixture containing 87.0 per cent of phenol, 1.5 per cent of water, a trace of benzene and the remainder cyclohexanone, about 11.5 per cent. The catalyst showed no sign of losing activity under such conditions. At the end of an additional forty-five hours of operation with the changed feed, the crude condensate from the converter effluent contained 97.0 per cent of phenol.

Preparation of the catalyst on a larger scale by repeated dipping of the support material into a concentrated solution of the salts of the catalyst ingredients, with intermediate roastings between dippings, did not allow as close a control of the ratios of active materials in the finished catalyst as was possible with the single evaporation procedure, followed by roasting, which is preferred.

Example 5

Using a catalyst prepared in accordance with the method of Example 1, 3-methylcyclohexenone was dehydrogenated to meta-cresol. (The 3-methylcyclohexenone was obtained by the reaction of ethylacetoacetate with formaldehyde, followed by acid hydrolysis according to the method of Knoevenagel and Klages, Annalen 281, 94 (1894).)

The 3-methylcyclohexenone was supplied to the converter at a feed rate of 168 milliliters per liter of catalyst per hour, in admixture with hydrogen fed as a diluent and to maintain catalyst activity. The catalyst was maintained at a temperature of about 350° C. Meta-cresol was produced in a single-pass yield of 95 per cent. The efficiency was 96 per cent.

Example 6

A mixture of alpha-tetralone and alpha-tetralol, such as is obtained from the liquid phase oxidation of tetralin, was dehydrogenated by passing it in admixture with hydrogen over a catalyst prepared in accordance with the procedure of Example 1. The mixture of the alpha-tetralone and alpha-tetralol was supplied to the converter at an average rate of 242.5 milliliters of liquid per hour per liter of catalyst, with the catalyst maintained at a temperature of about 350° C. Upon distillation of the crude condensate from the converter, alpha-naphthol was obtained in a single-pass yield of 74 per cent, at an efficiency of 84 per cent. Most of the loss in efficiency was due to dehydration of the tetralol, with subsequent formation of naphthalene which was recovered in 12 per cent yield.

*Example 7*

3-methyl-5-propylcyclohexenone was passed over a catalyst, prepared in accordance with the procedure of Example 1, at a feed rate of 168 milliliters per liter of catalyst per hour. Hydrogen was also supplied to the converter in admixture with the 3-methyl-5-propylcyclohexenone as a diluent and to maintain catalyst activity. The catalyst was maintained at a temperature of about 350° C. 5-propyl meta-cresol was produced in a single-pass yield of about 90 per cent and at an efficiency of 95 per cent.

The 5-propyl meta-cresol was found to have the following properties: B. P. 122–3° C. at 10 millimeters, abs.; $d\,^{30}_{15.6}$, 0.963; $n_D^{30}$, 1.5152; F. P. 11° C.; MR: calc. 46.8, obs. 47.1.

*Example 8*

3,5-dimethylcyclohexenone was converted to meta-xylenol by passing it over a catalyst maintained at a temperature of about 350° C. at a feed rate of 150 milliliters per liter of catalyst per hour. The catalyst was similar to that prepared and described in Example 1, and the 3,5-dimethylcyclohexenone was supplied to the converter in admixture with hydrogen as a diluent and to maintain catalyst activity. The meta-xylenol was produced in about 90 per cent yield and at an efficiency of about 95 per cent.

*Example 9*

Cyclohexanediol-1,2 (260 grams) was dissolved in one liter of water, the solution allowed to trickle into a vaporizer, and the vapors passed over a catalyst, in admixture with hydrogen, at a feed rate of 430 milliliters of solution per liter of catalyst per hour. The catalyst which was maintained at a temperature of about 350° C. was prepared according to the method of Example 1.

Pyrocatechol was produced in about 65 per cent yield, with about 25 per cent of the cyclohexanediol fed being converted to phenol.

*Example 10*

A number of catalysts were prepared, using the following materials in each:

Nickel (electrolytic) _____grams__ 24
Copper nitrate trihydrate, $Cu(NO_3)_2.3H_2O$
           grams__ 30
Chromium nitrate nonahydrate,
 $Cr(NO_3)_3.9H_2O$ _____do____ 3.5
Platinum chloride solution containing 20.0
 grams of platinum per liter___milliliters__ 2
Nickel sulfate solution containing 67.5 grams
 of nickel sulfate hexahydrate, $NiSO_4.6H_2O$
 per liter _____milliliters__ 8

The electrolytic nickel in each catalyst preparation was dissolved in an excess of nitric acid (35 per cent; C. P.) and the other ingredients added to form a solution of the mixture. To each catalyst preparation was also added a small amount of sodium hydroxide, the preparations differing from one another only in the amount of sodium hydroxide added, which amounts were 40, 60, 80, 120 and 160 milligrams, respectively. These amounts correspond respectively to 0.296, 0.444, 0.592, 0.888 and 1.184 parts of sodium sulfate per 100 parts of nickel. To each of the solution mixtures was added 200 milliliters of an inert, silicious support, and the respective preparations evaporated to dryness with stirring, until discrete particles were obtained, as in Example 1. The catalysts were then placed in a muffle furnace heated to a temperature of 375° C. and roasted at that temperature until the evolution of the oxides of nitrogen ceased—the roasting taking about three hours. The resulting granules were separated from the fines, placed in the converter tube, heated in air for a period of six hours, and after having been reduced in a stream of hydrogen at a temperature of about 375° C., each for a period of eight hours, the catalysts were ready for use.

*Example 11*

A number of runs were made using the catalysts of Example 10 containing 0.296, 0.444, 0.592, 0.888 and 1.184 parts, respectively, of sodium sulfate per 100 parts of nickel, in which mixtures of cyclohexanol and cyclohexanone were dehydrogenated to phenol following the procedure described in Example 1. A mixture of cyclohexanol and cyclohexanone was vaporized and mixed with hydrogen, the feed rates being 150 grams of cyclohexanol-cyclohexanone mixture, and 250 liters of hydrogen (at standard conditions) per liter of catalyst per hour.

The phenol and unconverted cyclohexanone were condensed from the converter effluent by cooling. The purity of the product in terms of per cent of phenol, for consecutive 24-hour periods of operation is given in the following table:

| Sodium Sulfate Content, parts per 100 parts Ni | Purity of Phenol Produced over 24-hour periods | | | | |
|---|---|---|---|---|---|
| | 1st | 2nd | 3rd | 4th | 5th |
| 0.296 | 90.8 | 89.5 | <88.7 | | |
| 0.444 | 93.0 | 95.1 | 92.3 | 89.5 | |
| 0.592 | 94.4 | 95.8 | 95.1 | 95.1 | 94.4 |
| 0.888 | 90.1 | 89.0 | | | |
| 1.184 | 90.8 | <79.5 | | | |

From these and other runs it has been found that the best results with sodium sulfate as stabilizer are obtained with a sodium sulfate content of about 0.3 to 0.8 part of sodium sulfate per 100 parts of nickel. Within this range, which is preferred, the life and activity of the catalyst are superior to those exhibited by mixtures having a smaller or larger proportion of sodium sulfate. Especially good results were obtained with a sodium sulfate content of about 0.6 part per 100 parts of nickel. Other runs have demonstrated that catalysts which did not contain platinum gave results the same as, or similar to those obtained with the catalysts of Example 10, the remaining constituents being present in the same proportions, based on the nickel content.

*Example 12*

A stock solution was prepared by dissolving 360 parts of electrolytic nickel in nitric acid and then adding 450 parts of copper nitrate crystals, Cu(NO₃)₂.3H₂O (C. P. grade), 60 parts of chromium nitrate crystals, Cr(NO₃)₃.9H₂O (C. P. grade) and 1.3 parts of concentrated sulfuric acid, all by weight. This solution was thoroughly blended, and diluted to a volume suitable for the preparation of fifteen lots of catalyst by use of aliquot portions of the solution. A soluble metal salt in dilute solution was added to each aliquot portion, alkali metals and magnesium being added as sulfates, and alkaline earths as nitrates. Each aliquot portion was then evaporated to dryness with 200 parts by weight of a ceramically-bonded porous silica as a support, and the residue roasted in a muffle furnace at a temperature of 375° C.

Each of the catalysts thus obtained was treated in similar fashion after being charged to the converter tube by first oxidizing it in a stream of air and then reducing it in a stream of hydrogen. Thereupon, cyclohexanone was dehydrogenated over the catalyst until its activity had diminished to the point where the freezing point of the converter product dropped below 25° C. After reactivation, the catalyst was considered ready for comparative testing. The purpose of this procedure was to eliminate apparent differences in catalyst behavior which often appear during the first period of operation but which prove to be of little, if any, real significance over long periods of operation.

The results of comparative tests of our stabilized catalysts in which the amount of alkali metal sulfate present was 0.6 part per 100 parts of nickel are presented in the following table:

the catalyst life was only 52 hours as compared with 123 hours for the rubidium salt. Calcium sulfate in that same quantity gave a very inferior catalyst while a catalyst containing but 0.3 part of calcium sulfate per 100 parts of nickel had a life of 25 hours with a phenol content in the product approximating that obtained with potassium sulfate in a concentration of 0.6 part per 100 parts of nickel.

Sulfate analyses of a number of our stabilized catalysts which had been operated for extended periods in the dehydrogenation of cyclohexanone showed sulfate present in an amount equivalent to the alkali metal sulfate used in their preparation. The sulfate determinations were made by a turbidimetric method on aqueous solutions from Soxhlet extraction of used catalyst samples.

Unless otherwise specifically indicated, the concentration of stabilizer is to be understood as being expressed in parts per 100 parts of the total nickel content of the catalyst, by weight.

What is claimed is:

1. A hydrogenation catalyst stabilized for operation as a dehydrogenation catalyst consisting essentially of nickel; copper, mostly in the form of metallic copper; chromium, mostly in the form of its oxide; and an alkali metal sulfate of the group consisting of lithium sulfate, sodium sulfate, potassium sulfate, rubidium sulfate and caesium sulfate, said copper and chromium being present in a ratio of about 15 to 40 parts of copper and about 0.5 to 4 parts of chromium per 100 parts of nickel, computed on a metal basis by weight; and said alkali metal sulfate being pres-

| Alkali Sulfate | Induction Period, Hours [1] | Catalyst Life, Hours [2] | Estimated Phenol Content of Product Based on Physical Properties [3] | | | |
|---|---|---|---|---|---|---|
| | | | Freezing Product, °C. | Point of Average, Per Cent | Specific Product, 40°/15.6° C. | Gravity of Average, Per Cent |
| Lithium | 2 | 104 | 34.0 | 92.5 | 1.054 | 96.0 |
| Sodium | 11 | 109 | 34.5 | 93.0 | 1.055 | 96.5 |
| Potassium | 2 | 128 | 32.5 | 91.0 | 1.052 | 94.5 |
| Rubidium | 0 | 123 | 36.0 | 94.5 | 1.055 | 96.5 |
| Caesium | 0 | 100 | 33.5 | 92.0 | 1.051 | 93.5 |
| Control [4] | 2 | 56 | 28.0 | 87.5 | 1.046 | 90.0 |

[1] Hours of operation before freezing point of product rose to 25° C. and above.
[2] Hours of operation after induction period and before freezing point of product fell to 25° C.
[3] Average over active life of catalyst.
[4] No stabilizer.

With an increase in the content of rubidium sulfate to 1.2 parts, no significant change was noted except for a decrease in the catalyst life to a period of 96 hours, as compared with 123 hours for one-half that amount of stabilizer. A further increase in the amount of rubidium stabilizer to 2.25 parts gave a product having an estimated phenol content of 90.7 to 93.5 per cent, still above that obtained with no alkali sulfate in the catalyst, but the catalyst life at high activity dropped to only six hours.

In contrast to the improvement obtained with our alkali metal sulfate stabilized catalyst, the results obtained with a catalyst containing 0.6 part of magnesium sulfate were about the same as with the unstabilized catalyst. However, the same amount of barium sulfate per 100 parts of nickel gave about the same improvement in conversion as a like quantity of rubidium sulfate but ent in a ratio of at least 0.3 part per 100 parts of nickel, by weight, and not more than 0.8 part of lithium sulfate; 0.8 part of sodium sulfate; 1.0 part of potassium sulfate; 1.5 parts of rubidium sulfate; and 2.0 parts of caesium sulfate, all per 100 parts of nickel by weight, with a total alkali metal sulfate content not to exceed 0.33 grammols per 100 gram atoms of nickel.

2. A hydrogenation catalyst stabilized for operation as a dehydrogenation catalyst consisting essentially of nickel; copper, mostly in the form of metallic copper; chromium, mostly in the form of its oxide; and an alkali metal sulfate of the group consisting of lithium sulfate, sodium sulfate, potassium sulfate, rubidium sulfate and caesium sulfate, said copper and chromium being present in a ratio of about 15 to 40 parts of copper and about 2 parts of chromium per 100 parts of nickel, computed on a metal basis by weight;

and said alkali metal sulfate being present in a ratio of at least 0.3 part per 100 parts of nickel, by weight, and not more than 0.8 part of lithium sulfate; 0.8 part of sodium sulfate; 1.0 part of potassium sulfate; 1.5 parts of rubidium sulfate; and 2.0 parts of caesium sulfate, all per 100 parts of nickel by weight, with a total alkali metal sulfate content not to exceed 0.33 gram-mols per 100 gram atoms of nickel.

3. A hydrogenation catalyst stabilized for operation as a dehydrogenation catalyst consisting essentially of nickel; copper, mostly in the form of metallic copper; chromium, mostly in the form of its oxide, and lithium sulfate; said copper and chromium being present in a ratio of about 15 to 40 parts of copper and 0.5 to 4 parts of chromium per 100 parts of nickel, computed on a metal basis by weight, and said lithium sulfate being present in a ratio from 0.3 part to 0.8 part per 100 parts of nickel, by weight.

4. A hydrogenation catalyst stabilized for operation as a dehydrogenation catalyst consisting essentially of nickel; copper, mostly in the form of metallic copper; chromium, mostly in the form of its oxide, and sodium sulfate; said copper and chromium being present in a ratio of about 15 to 40 parts of copper and 0.5 to 4 parts of chromium per 100 parts of nickel, computed on a metal basis by weight, and said sodium sulfate being present in a ratio from 0.3 part to 0.8 part per 100 parts of nickel, by weight.

5. A hydrogenation catalyst stabilized for operation as a dehydrogenation catalyst consisting essentially of nickel; copper, mostly in the form of metallic copper; chromium, mostly in the form of its oxide, and potassium sulfate; said copper and chromium being present in a ratio of about 15 to 40 parts of copper and 0.5 to 4 parts of chromium per 100 parts of nickel, computed on a metal basis by weight, and said potassium sulfate being present in a ratio from 0.3 part to 1.0 part per 100 parts of nickel, by weight.

6. A hydrogenation catalyst stabilized for operation as a dehydrogenation catalyst consisting essentially of nickel; copper, mostly in the form of metallic copper; chromium, mostly in the form of its oxide, and rubidium sulfate; said copper and chromium being present in a ratio of about 15 to 40 parts of copper and 0.5 to 4 parts of chromium per 100 parts of nickel, computed on a metal basis by weight, and said rubidium sulfate being present in a ratio from 0.3 part to 1.5 parts per 100 parts of nickel, by weight.

7. A hydrogenation catalyst stabilized for operation as a dehydrogenation catalyst consisting essentially of nickel; copper, mostly in the form of metallic copper; chromium, mostly in the form of its oxide, and caesium sulfate; said copper and chromium being present in a ratio of about 15 to 40 parts of copper and 0.5 to 4 parts of chromium per 100 parts of nickel, computed on a metal basis by weight, and said caesium sulfate being present in a ratio from 0.3 part to 2.0 parts per 100 parts of nickel, by weight.

8. In a method of making a nickel, copper, chromium hydrogenation catalyst wherein compounds of said metals are deposited from an aqueous solution of their water-soluble salts by removal of water therefrom, the deposited compounds then roasted to decompose them, and thereafter heated in a current of hydrogen to convert the nickel to the form of metallic nickel, the copper mostly to the form of a metallic copper with the chromium being mostly in the form of its oxide, said copper and chromium being in the ratio of from 15 to 40 parts of copper and 0.5 to 4 parts of chromium per 100 parts of nickel, computed on a metal basis, by weight, the improvement which includes depositing with said metal compounds, and in intimate admixture therewith, alkali metal sulfate in the proportion of about 0.3 part per 100 parts of nickel, by weight, to 0.33 gram-mol per 100 gram atoms of nickel to stabilize the catalyst for dehydrogenation operation.

9. In a method of making a nickel, copper, chromium hydrogenation catalyst wherein compounds of said metals are deposited from an aqueous solution of their water-soluble salts by removal of water therefrom, the deposited compounds then roasted to decompose them, and thereafter heated in a current of hydrogen to convert the nickel to the form of metallic nickel, the copper mostly to the form of metallic copper with the chromium being mostly in the form of its oxide, said copper and chromium being in the ratio of from 15 to 40 parts of copper and 2 parts of chromium per 100 parts of nickel, computed on a metal basis, by weight, the improvement which includes depositing with said metal compounds, and in intimate admixture therewith, alkali metal sulfate in the proportion of about 0.3 part per 100 parts of nickel, by weight, to 0.33 gram-mol per 100 gram atoms of nickel to stabilize the catalyst for dehydrogenation operation.

10. In a method of making a nickel, copper, chromium hydrogenation catalyst wherein compounds of said metals are deposited from an aqueous solution of their water-soluble salts by removal of water therefrom, the deposited compounds then roasted to decompose them, and thereafter heated in a current of hydrogen to convert the nickel to the form of metallic nickel, the copper mostly to the form of metallic copper with the chromium being mostly in the form of its oxide, said copper and chromium being in the ratio of from 15 to 40 parts of copper and 0.5 to 4 parts of chromium per 100 parts of nickel, computed on a metal basis, by weight, the improvement which includes depositing with said metal compounds and in intimate admixture therewith, alkali metal sulfate in the proportion of about 0.3 part per 100 parts of nickel, by weight, to 0.33 gram-mol per 100 gram atoms of nickel and carrying out said roasting in the presence of a small amount of sulfuric acid, to stabilize the catalyst for dehydrogenation operation.

11. In a method of making a nickel, copper, chromium hydrogenation catalyst wherein compounds of said metals are deposited from an aqueous solution of their water-soluble salts by removal of water therefrom, the deposited compounds then roasted to decompose them, and thereafter heated in a current of hydrogen to convert the nickel to the form of metallic nickel, the copper mostly to the form of metallic copper with the chromium being mostly in the form of its oxide, said copper and chromium being in the ratio of from 15 to 40 parts of copper and 2 parts of chromium per 100 parts of nickel, computed on a metal basis, by weight, the improvement which includes depositing with said metal compounds and in intimate admixture therewith, alkali metal sulfate in the proportion of about 0.3 part per 100 parts of nickel, by weight, to 0.33 gram-mol per 100 gram atoms of nickel and carrying out said roasting in the presence of a small amount of sulfuric acid, to stabilize the catalyst for dehydrogenation operation.

HENRY C. CHITWOOD.
    JOHN T. FITZPATRICK.
    GEORGE W. FOWLER.
    BENJAMIN T. FREURE.

REFERENCES CITED

The following references are of record in the file of this patent:

UNITED STATES PATENTS

| Number | Name | Date |
|---|---|---|
| 1,905,433 | Bennett et al. | Apr. 25, 1933 |
| 2,071,704 | Normann et al. | Feb. 23, 1937 |
| 2,093,159 | Schmidt | Sept. 14, 1937 |
| 2,369,432 | Byrns | Feb. 13, 1945 |
| 2,408,140 | Gutzeit | Sept. 24, 1946 |
| 2,423,415 | Soday | July 1, 1947 |
| 2,432,356 | Underwood | Dec. 9, 1947 |